United States Patent
Shizuku

(10) Patent No.: US 10,115,976 B2
(45) Date of Patent: Oct. 30, 2018

(54) TERMINAL PLATE FOR FUEL CELL, MANUFACTURING METHOD OF TERMINAL PLATE FOR FUEL CELL, AND FUEL CELL

(71) Applicant: TOYOTA JIDOSHA KABUSHIKI KAISHA, Toyota-shi, Aichi-ken (JP)

(72) Inventor: Fumishige Shizuku, Seto (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 9 days.

(21) Appl. No.: 14/655,938

(22) PCT Filed: Oct. 2, 2014

(86) PCT No.: PCT/JP2014/005028
§ 371 (c)(1),
(2) Date: Jun. 26, 2015

(87) PCT Pub. No.: WO2015/064013
PCT Pub. Date: May 7, 2015

(65) Prior Publication Data
US 2016/0329577 A1    Nov. 10, 2016

(30) Foreign Application Priority Data
Oct. 30, 2013  (JP) .................................. 2013-224967

(51) Int. Cl.
*H01M 8/02*     (2016.01)
*H01M 8/24*     (2016.01)
(Continued)

(52) U.S. Cl.
CPC ....... *H01M 8/0273* (2013.01); *H01M 8/0206* (2013.01); *H01M 8/0228* (2013.01);
(Continued)

(58) Field of Classification Search
CPC .... H01M 8/02; H01M 8/0273; H01M 8/0288; H01M 8/0228; H01M 8/0206; H01M 8/0247; B21D 51/18; B21D 51/16
See application file for complete search history.

(56) References Cited

U.S. PATENT DOCUMENTS 1,981,915 A  *  11/1934  Hormel .................. B21D 51/18
                                                                138/142
5,677,088 A  *  10/1997  Kobayashi .............. H01M 4/80
                                                                429/235

(Continued)

FOREIGN PATENT DOCUMENTS

JP        2002-093454 A     3/2002
JP        2004-103296 A     4/2004
(Continued)

OTHER PUBLICATIONS

Office Action issued in U.S. Appl. No. 14/874,716 dated Mar. 13, 2018.
(Continued)

Primary Examiner — Kenneth J Douyette
(74) Attorney, Agent, or Firm — Finnegan, Henderson, Farabow, Garrett & Dunner, LLP

(57) ABSTRACT

A terminal plate 160F is configured such that an electrically conductive aluminum core plate 181 having a current collector terminal 161 is placed between a titanium cell-side plate 182 and a titanium end plate-side plate 183 both having higher corrosion resistance. Both the cell-side plate 182 and the end plate-side plate 183 have plate outer peripheries extended more outward than the outer periphery of the core plate 181. A plate adhesive seal member 184 is arranged to cover the outer peripheries of the respective plates including the core plate 181 and keep the plate-sandwiched state. The core plate 181 has a gold-plated outer peripheral end face and is thereby in the non-bonded state with the plate adhesive seal member 184 on the outer peripheral end face.

10 Claims, 5 Drawing Sheets

(51) Int. Cl.
*H01M 8/0273* (2016.01)
*H01M 8/0206* (2016.01)
*H01M 8/0228* (2016.01)
*H01M 8/0271* (2016.01)
*H01M 8/242* (2016.01)
*H01M 8/1018* (2016.01)

(52) U.S. Cl.
CPC .......... *H01M 8/0271* (2013.01); *H01M 8/242* (2013.01); *H01M 2008/1095* (2013.01); *Y02P 70/56* (2015.11)

(56) References Cited

U.S. PATENT DOCUMENTS

| | | | |
|---|---|---|---|
| 8,153,333 | B2 | 4/2012 | Sugita et al. |
| 2002/0031697 | A1 | 3/2002 | Sugita et al. |
| 2004/0137299 | A1 | 7/2004 | Mazza et al. |
| 2006/0040159 | A1* | 2/2006 | Sato .................... H01M 8/0206 429/434 |
| 2010/0273076 | A1* | 10/2010 | Kunitake ............ H01M 8/0228 429/434 |
| 2014/0051007 | A1 | 2/2014 | Blanchet et al. |

FOREIGN PATENT DOCUMENTS

| | | |
|---|---|---|
| JP | 2008-300131 A | 12/2008 |
| JP | 2009-187729 | 8/2009 |
| JP | 2010-189749 A | 9/2010 |
| JP | 5342897 B2 | 11/2013 |
| JP | 2015-088294 A | 5/2015 |

OTHER PUBLICATIONS

U.S. Appl. No. 14/874,716, filed Oct. 5, 2015.
Notice of Allowance issued in U.S. Appl. No. 14/874,716 dated Jul. 27, 2018.

* cited by examiner

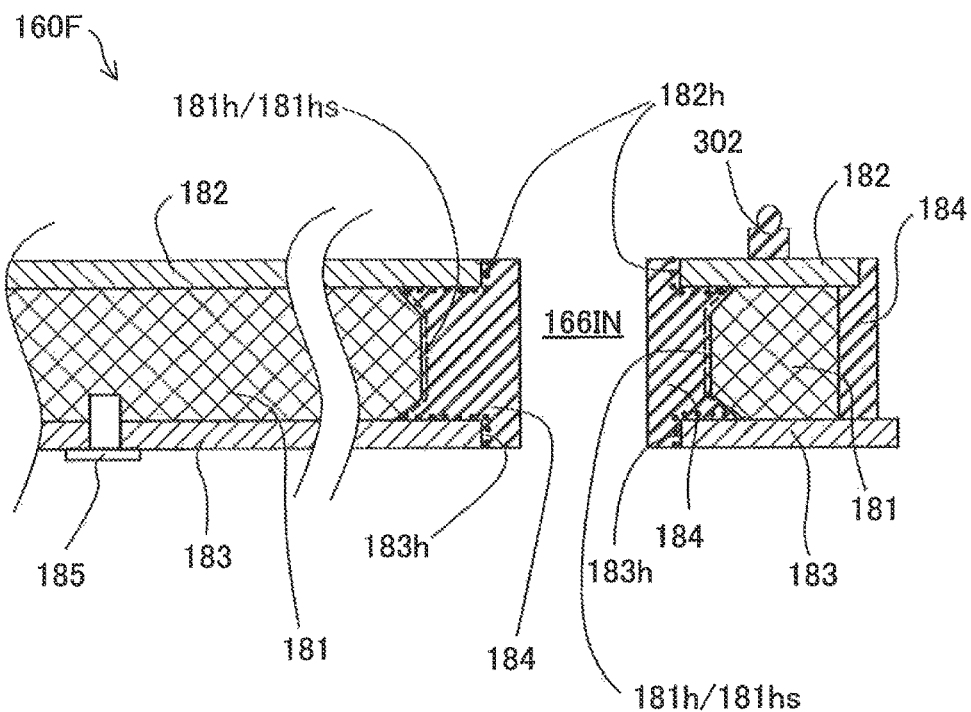
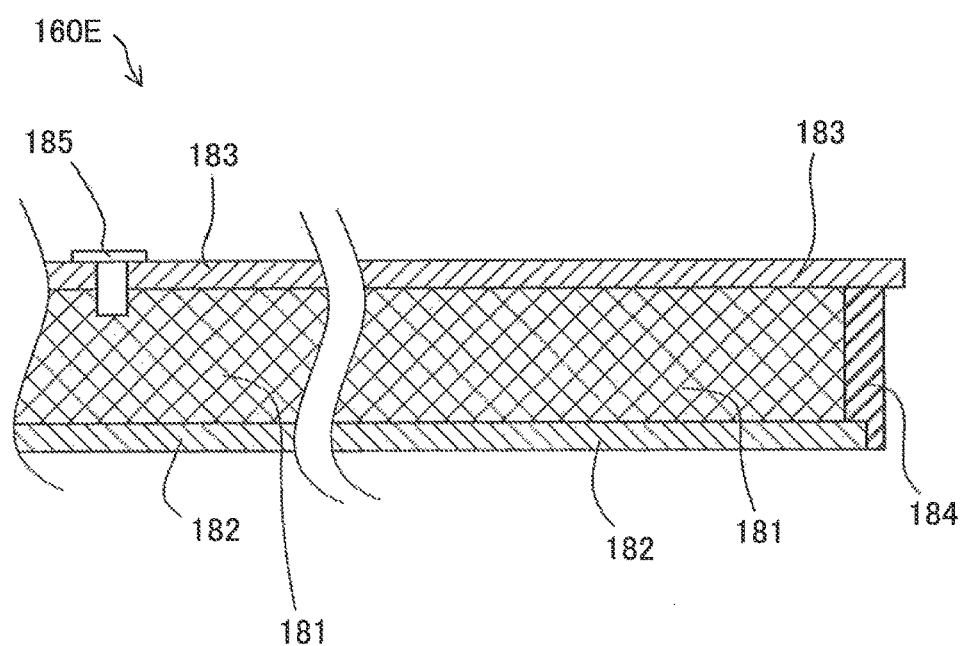

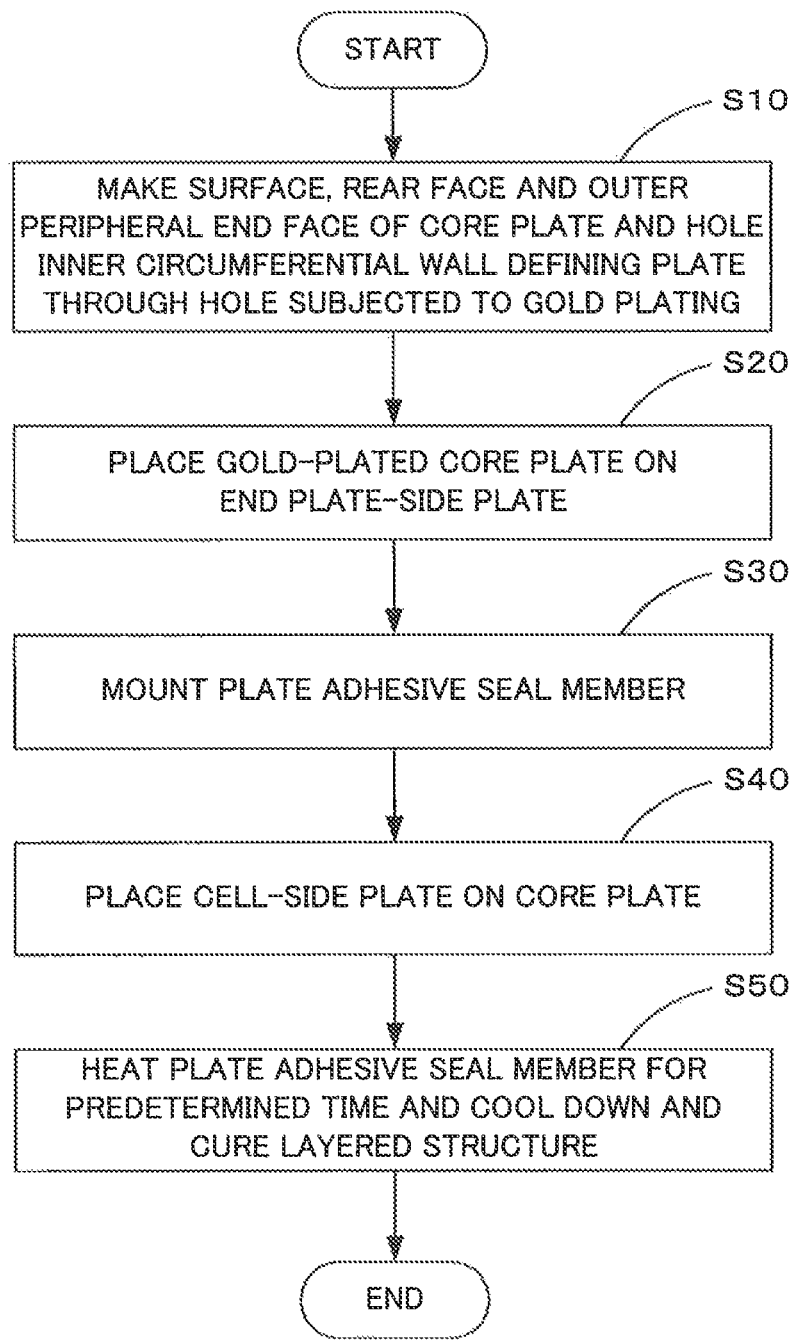

TERMINAL PLATE FOR FUEL CELL, MANUFACTURING METHOD OF TERMINAL PLATE FOR FUEL CELL, AND FUEL CELL

CROSS-REFERENCE TO RELATED APPLICATIONS

This application is a national phase application of International Application No. PCT/JP2014/005028, filed Oct. 2, 2014, and claims the priority of Japanese Application No. 2013-224967, filed Oct. 30, 2013, the content of both of which is incorporated herein by reference.

TECHNICAL FIELD

The present invention relates to a terminal plate for fuel cell, a manufacturing method of a terminal plate for fuel cell, and a fuel cell.

BACKGROUND ART

A fuel cell has a stack structure in which a plurality of fuel cell units as power generation units are stacked, and includes terminal plates provided on the respective ends of the plurality of stacked fuel cell units to output the generated electric power to outside. A recently proposed technique employs a layered structure of a metal plate having corrosion resistance and a metal plate having good electrical conductivity for a terminal plate, in order to enhance the durability of the terminal plate as described in, for example, JP 2009-187729A.

In the terminal plate having the layered structure of different metal plates proposed in the above patent literature, not only the plate plane (surface) but the plate end face is coated with a corrosion-resistant conductive material layer, for example, a thermosetting resin mixed with electrically conductive metal powder. The plate end face is coated with the corrosion-resistant conductive material layer, and the terminal plate is fixed at its outer periphery. This may prevent misalignment between the plates due to different linear expansion coefficients of the respective plates and electrical corrosion at the contact faces of the respective plates.

The different metal plates constituting the terminal plate, however, have different linear expansion coefficients and have different degrees of expansion and contraction during power generation operation of the fuel cell. In the plate end face of the different metal plates, the corrosion-resistant conductive material layer bonded to the plate end face is repeatedly pushed and pulled, accompanied with expansion and contraction of the plates and may thus be deteriorated. The disclosure of the above literature does not fully consider the countermeasure against such expansion and contraction of the plates. There is accordingly still room for improvement of the durability of the terminal plate having the layered structure of different metal plates and the durability of the fuel cell. Other needs include a simple technique for improving the durability and reduction of the manufacturing cost of the fuel cell.

In order to solve at least part of the problems described above, the invention may be implemented by aspects described below.

SUMMARY

According to a first aspect, a terminal plate for fuel cell is provided. The terminal plate for fuel cell of the first aspect comprises a first metal plate being electrically conductive and configured to have a terminal element; a second metal plate and a third metal plate formed to have higher corrosion resistance than the first metal plate and placed on a surface and a rear face of the first metal plate, the second metal plate and the third metal plate having outer peripheral areas extended more outward than an outer periphery of the first metal plate; and an elastic seal member bonded with the outer peripheral areas of the second and the third metal plates to seal outer peripheries of the first, the second and the third metal plates.

The respective metal plates may repeat expansion and contraction at different degrees according to different linear expansion coefficients. In the terminal plate for fuel cell of the first aspect, the first metal plate placed between the second and the third metal plates is, however, not bonded with the elastic seal member. This configuration does not cause the elastic seal member to be pulled, accompanied with contraction of the first metal plate. The configuration of the terminal plate for fuel cell of the first aspect accordingly suppresses deterioration of the elastic seal member and contributes to improving the durability.

In the terminal plate of the first aspect, the elastic seal member may be bonded with the outer peripheral areas of the opposed second and third metal plates respectively placed on the surface and the rear face of the first metal plate. The elastic seal member may further be bonded with outer peripheral end faces of the second and the third metal plates. This configuration of the terminal plate of the first aspect suppresses deterioration of the elastic seal member while maintaining the sealing property.

In the terminal plate of the first aspect, each of the metal plates may have supply through holes for supplying a fuel gas, an oxidizing gas and cooling water and discharge through holes for discharging the fuel gas, the oxidizing gas and the cooling water, in its outer peripheral area. The first metal plate may have plate through holes having diameters larger than diameters of the supply through holes and the discharge through holes. The second and the third metal plates may respectively have plate through holes having diameters larger than the diameters of the supply through holes and the discharge through holes but smaller than the diameters of the plate through holes in the first metal plate. The elastic seal member may be bonded with hole peripheral areas of the plate through holes in the opposed second and third metal plates to form the supply through holes and the discharge through holes. In this configuration of the terminal plate of the first aspect, the elastic seal member is not bonded with the first metal plate in the hole peripheral areas as the peripheries of the supply through holes and the discharge through holes. This configuration prevents the elastic seal member from being pulled, accompanied with contraction of the first metal plate. This configuration is advantageous in terms of suppressing deterioration of the elastic seal member and improving the durability.

In the terminal plate of the first aspect, the elastic seal member may further be bonded with hole inner circumferential walls of the plate through holes in the second and the third metal plates. This configuration of the terminal plate of the first aspect suppresses deterioration of the elastic seal member, while maintaining the sealing property in the through holes.

In the terminal plate of the first aspect, the surface and the rear face in at least the outer peripheral area of the first metal plate and an outer peripheral end face of the first metal plate may be plated with gold. This configuration of the terminal plate of the first aspect more easily suppresses or prevents the first metal plate from being bonded with the elastic seal member.

According to a second aspect, a fuel cell is provided. The fuel cell of the second aspect comprises a cell stack in which a plurality of fuel cell units as power generation units are stacked; and the terminal plates of any of the above configurations of the first aspect placed on one end and the other end in a stacking direction of the cell stack. The fuel cell of the second aspect includes the terminal plates having the durability improved by suppressing deterioration of the elastic seal member and thereby has the improved durability and the long cell life. The fuel cell of the second aspect is manufactured by simply replacing the terminal plates of the existing fuel cell. This reduces the manufacturing cost.

According to a third aspect, a manufacturing method of a terminal plate for fuel cell is provided. The manufacturing method of the terminal plate for fuel cell of the third aspect comprises plating at least an outer peripheral area and an outer peripheral end face in a surface and a rear face of a first metal plate with gold; placing the gold-plated first metal plate on a second metal plate; mounting an elastic seal member to cover the outer peripheral end face of the gold-plated first metal plate; placing a third metal plate on the gold-plated first metal plate to form a layered structure of the first, the second and the third metal plates; and heating the layered structure. The respective metal plates may repeat expansion and contraction at different degrees according to different linear expansion coefficients. In the manufacturing method of the terminal plate for fuel cell of the third aspect, however, the first metal plate placed between the second and the third metal plates is not bonded with the elastic seal member. This configuration does not cause the elastic seal member to be pulled, accompanied with contraction of the first metal plate. This configuration accordingly suppresses deterioration of the elastic seal member and allows for production of the terminal plate for fuel cell that contributes to improving the durability.

In the manufacturing method of the third aspect, the first metal plate may have a through hole, and a hole inner circumferential wall of the through hole may be subjected to gold plating. The elastic seal member may be arranged to further cover the hole inner circumferential wall of the through hole. This configuration of the manufacturing method of the third aspect suppresses deterioration of the elastic seal member, while maintaining the sealing property in the periphery of the through hole and allows for production of the terminal plate for fuel cell that contributes to improving the durability.

The invention may be implemented by various other aspects, for example, a manufacturing method of a terminal plate for fuel cell and a fuel cell unit.

BRIEF DESCRIPTION OF DRAWING

FIG. 3 is a cross sectional view illustrating the terminal plate 160F, taken on a line 3-3 in FIG. 2;

FIG. 4 is a cross sectional view illustrating the terminal plate 160E, taken on a line 4-4 in FIG. 2;

FIG. 5 is a flowchart showing a manufacturing procedure of a terminal plate according to the embodiment.

DESCRIPTION OF EMBODIMENTS

Figure 1:
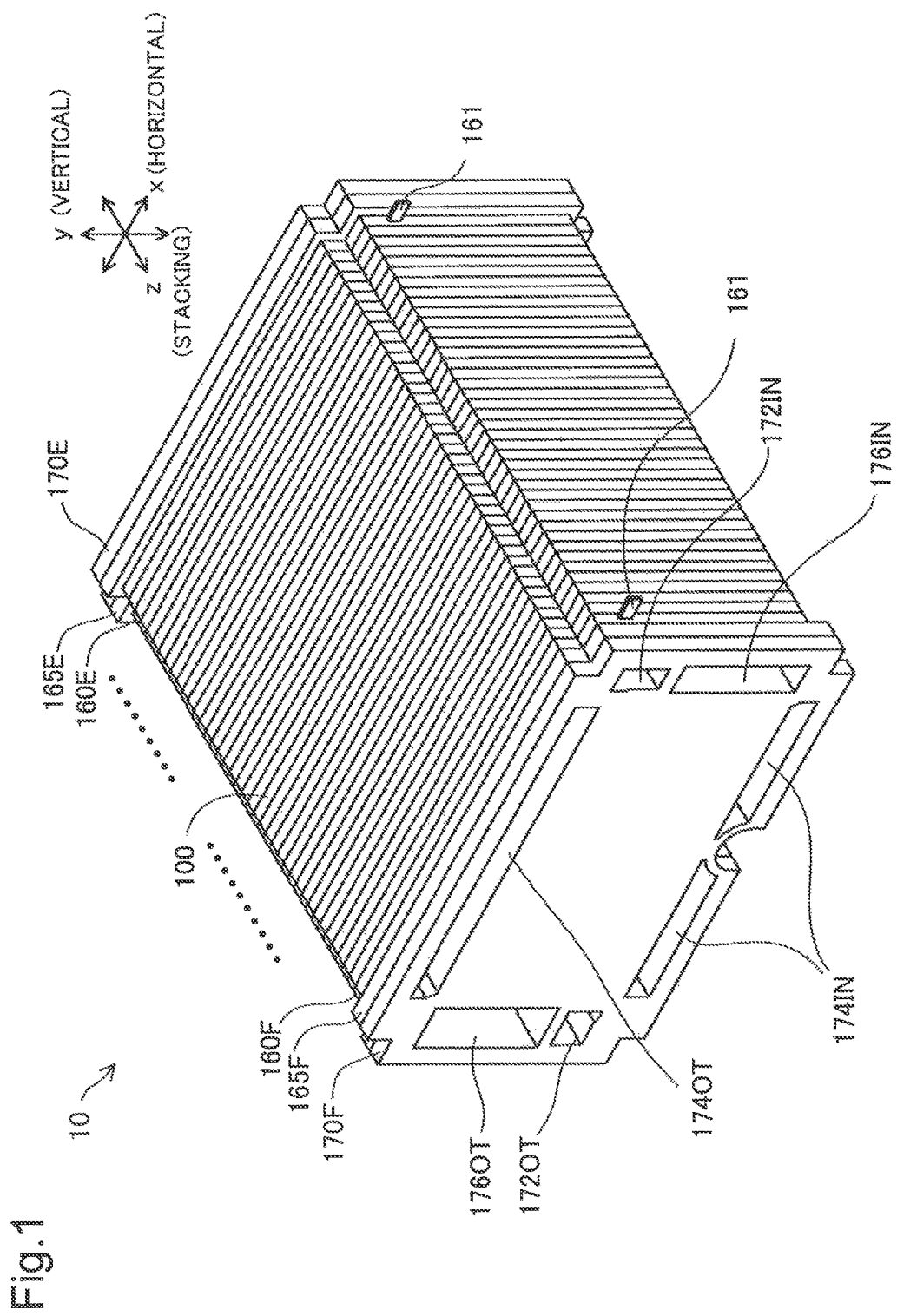
FIG. 1 is a schematic perspective view illustrating the configuration of a fuel cell 10 according to one embodiment of the invention.

The following describes embodiments of the invention with reference to the drawings. FIG. 1 is a schematic perspective view illustrating the configuration of a fuel cell 10 according to one embodiment of the invention. The fuel cell 10 has a stack structure in which a plurality of unit cells 100 provided as fuel cell units are stacked in a Z direction (hereinafter also referred to as "stacking direction") and are placed between a pair of end plates 170F and 170E. The fuel cell 10 has a front end-side terminal plate 160F placed with a front end-side insulating plate 165F between the front end-side end plate 170F and the unit cells 100. The fuel cell 10 similarly has a rear end-side terminal plate 160E placed with a rear end-side insulating plate 165E between the rear end-side end plate 170E and the unit cells 100. The unit cells 100, the terminal plates 160F and 160E, the insulating plates 165F and 165E and the end plates 170F and 170E respectively have plate-like structures in an approximately rectangular shape and are arranged to have their longer sides along an X direction (horizontal direction) and their shorter sides along a Y direction (vertical direction). The front end side and the rear end side denote the sides of respective ends of the fuel cell 10 in the longitudinal direction.

Each of the end plate 170F, the insulating plate 165F and the terminal plate 160F on the front end side has a fuel gas supply hole 172IN, a fuel gas discharge hole 172OT, oxidizing gas supply holes 174IN, an oxidizing gas discharge hole 174OT, a cooling water supply hole 176IN and a cooling water discharge hole 176OT. These supply holes and discharge holes are stacked and connected with supply holes and discharge holes (not shown) provided at corresponding positions in the respective unit cells 100, so as to form supply manifolds and discharge manifolds for the corresponding gases and cooling water. These supply holes and discharge holes are, however, not provided in the end plate 170E, the insulating plate 165E and the terminal plate 160E on the rear end side. This configuration is attributed to the type of the fuel cell that the reactive gases (fuel gas and oxidizing gas) and cooling water are supplied from the front end-side end plate 170F through the corresponding supply manifolds to the respective unit cells 100 and that the exhaust gases and discharged water are discharged from the respective unit cells 100 through the corresponding discharge manifolds and the front end-side end plate 170F to the outside. The type of the fuel cell is, however, not limited to this configuration but may employ any of various other configurations, for example, the configuration that the reactive gases and cooling water are supplied from the front end-side end plate 170F and that the exhaust gases and discharged water are discharged through the rear end-side end plate 170E to the outside.

The oxidizing gas supply holes 174IN are arranged along the X direction (longitudinal direction) in an outer peripheral section at a lower edge of the front end-side end plate 170F, and the oxidizing gas discharge hole 174OT is arranged along the X direction in an outer peripheral section at an upper edge. The fuel gas supply hole 172IN is arranged in an upper end part in the Y direction (short side direction) in an outer peripheral section at a right edge of the front end-side end plate 170F, and the fuel gas discharge hole 172OT is arranged in a lower end part in the Y direction in an outer peripheral section at a left edge. The cooling water supply hole 176IN is arranged along the Y direction below the fuel gas supply hole 172IN, and the cooling water discharge hole 1760T is arranged along the Y direction above the fuel gas supply and discharge hole 1720T. Each of the above supply holes and discharge holes is divided into a plurality of supply holes or discharge holes in each of the unit cells 100 as described later. In this embodiment, the outer peripheral section denotes an outer peripheral area located between an outer circumference and a center area of each plate.

The front end-side terminal plate 160F and the rear end-side terminal plate 160E serve as current collectors of the electric power generated by the respective unit cells 100. The collected electric power is output from current collector terminals 161 to outside. The respective terminal plates will be described below.

Figure 2:
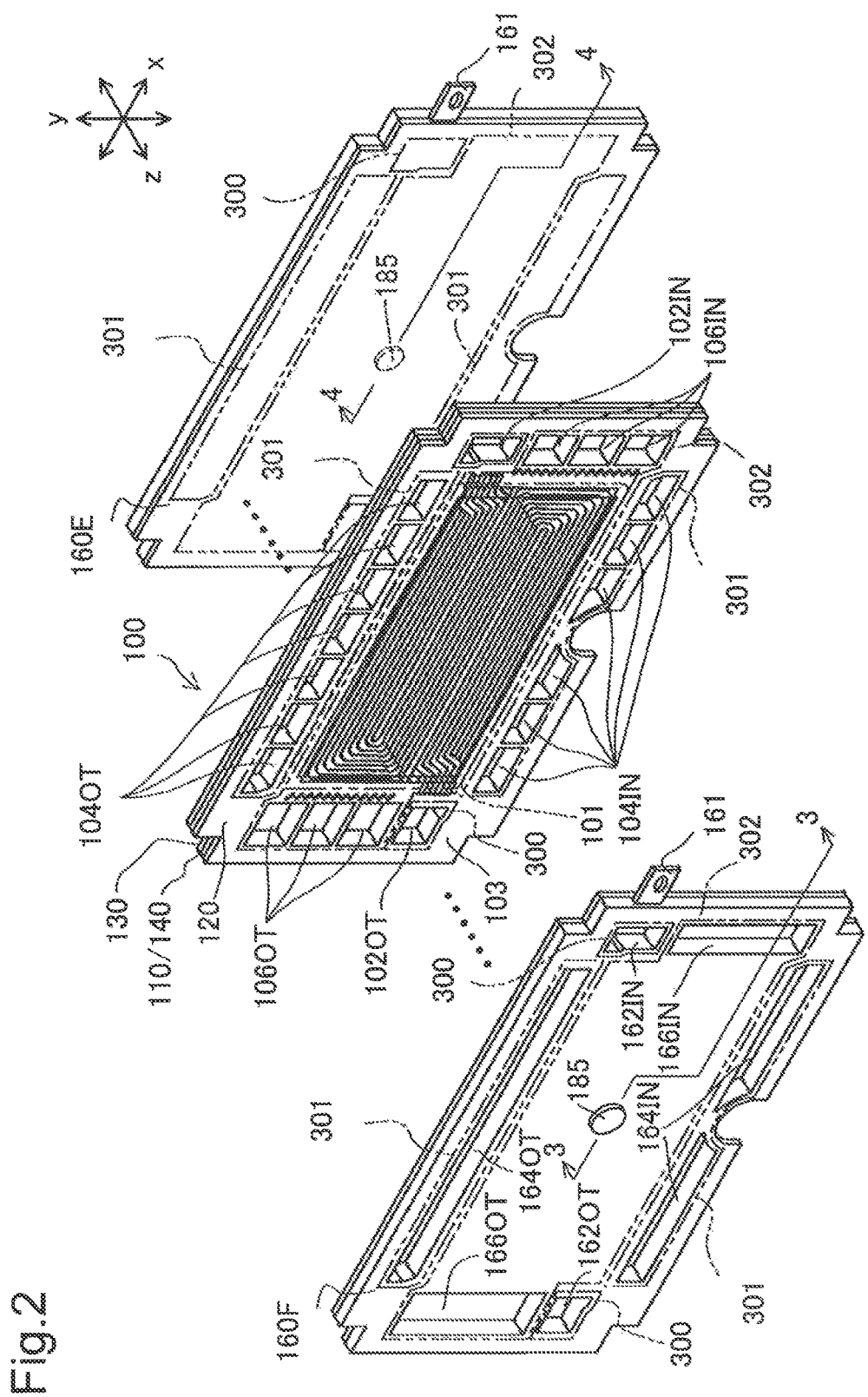
FIG. 2 is a diagram schematically illustrating the geometry of a terminal plate 160F, a unit cell 100 and a terminal plate 160E.

FIG. 2 is a diagram schematically illustrating the geometry of the terminal plate 160F, the unit cell 100 and the terminal plate 160E. As illustrated, the unit cell 100 has an anode-side separator 120, a cathode-side separator 130 and an adhesive seal 140. The adhesive seal 140 is arranged to hold a membrane electrode and gas diffusion layer assembly (MEGA) 110 over an illustrated separator center area 101 and seal the outer periphery of the MEGA 110. In the unit cell 100, the adhesive seal 140 arranged to hold the MEGA 110 is placed between the anode-side separator 120 and the cathode-side separator 130, so that the MEGA 110 is placed between the respective separators in the separator center area 101 and the adhesive seal 140 serves to seal between the respective separators in an outer peripheral area 103 around the separator center area 101.

The MEGA 110 includes a membrane electrode assembly (MEG) in which a pair of catalyst electrode layers are formed on respective surfaces of an electrolyte membrane, and serves as a power generation element configured by placing the MEA between gas diffusion layers (GDL) having gas diffusibility and permeability. The MEGA may be called MEA herein.

The anode-side separator 120 and the cathode-side separator 130 are made of a material having gas barrier property and electrical conductivity, for example, a carbon material such as gas-impermeable dense carbon obtained by compression of carbon particles or a press molded metal material such as stainless steel or titanium steel. In this embodiment, the anode-side separator 120 is produced by press molding stainless steel.

The anode-side separator 120 has a plurality of groove-like fuel gas flow paths on the MEGA 110-side surface and a plurality of groove-like cooling water flow paths on the opposite surface. These two different flow paths are arranged alternately on the surface and the rear face of the separators. The unit cell 100 has a fuel gas supply hole 102IN, a fuel gas discharge hole 1020T, a plurality of oxidizing gas supply holes 104IN, a plurality of oxidizing gas discharge holes 1040T, a plurality of cooling water supply holes 106IN and a plurality of cooling water discharge holes 1060T formed to pass through the anode-side separator 120, the adhesive seal 140 and the cathode-side separator 130. These supply and discharge holes are connected with the corresponding holes, for example, the fuel gas supply hole 172IN in the end plate 170F and serve as the manifolds described above in the unit cell. The flow paths formed in the anode-side separator 120 are not directly involved in the subject matter of the invention, so that their detailed description is omitted herein.

The adhesive seal 140 is made of, for example, a resin or rubber having sealing property and insulating property and has a non-illustrated power generation area window adaptable to the rectangular shape of the MEGA 110, on its center. The MEGA 110 is placed and fit in the power generation area window. The adhesive seal 140 serves to seal between the anode-side separator 120 and the cathode-side separator 10 including their peripheries of the supply and discharge holes in the state that the MEGA 110 is placed in the power generation area window. Each of the anode-side and separator-side separators has fuel gas sealing members 300, oxidizing gas sealing members 301 and cooling water sealing members 302 provided to ensure the sealing properties of the respective supply and discharge holes for the fuel gas, the oxidizing gas and the cooling water on joint surfaces of adjacent separators in the stack of the unit cells 100.

The front end-side terminal plate 160 and the rear end-side terminal plate 160E of the fuel cell 10 differ from each other by the presence or the absence of the supply and discharge holes but otherwise have similar configurations. FIG. 3 is a cross sectional view illustrating the terminal plate 160F, taken on a line 3-3 in FIG. 2. FIG. 4 is a cross sectional view illustrating the terminal plate 160E, taken on a line 4-4 in FIG. 2.

As illustrated, the terminal plate 160F has a core plate 181 with the current collector terminal 161 (shown in FIGS. 1 and 2), a cell-side plate 182, an end plate-side plate 183, a plate adhesive seal member 184 and an inter-plate pin 185. The terminal plate 160F also has a fuel gas supply hole 162IN, a fuel gas discharge hole 1620T, an oxidizing gas supply hole 164IN, an oxidizing gas discharge hole 1640T, a cooling water supply hole 166IN and a cooling water discharge hole 1660T formed to pass through these respective plate components. These supply and discharge holes are connected with the corresponding holes, for example, the fuel gas supply hole 172IN in the end plate 170F and the fuel gas supply holes 102IN in the unit cells 100 and serve as gas and cooling water manifolds leading to the unit cells.

The core plate 181 is a plate made of a metal having electrical conductivity, for example, gold, silver, copper or aluminum. In terms of cost reduction and weight reduction, this embodiment employs an aluminum plate of about 1.0 to 5.0 mm in thickness for the core plate 181. The cell-side plate 182 and the end plate-side plate 183 are both metal plates (0.1 to 1.0 mm in thickness), such as titanium, having the higher corrosion resistance than that of the core plate 181 and have larger outer shapes than that of the core plate 181. More specifically, plate outer peripheries defined by the outer peripheries of both the cell-side plate 182 and the end plate-side plate 183 are extended more outward than the outer periphery of the core plate 181. The cell-side plate 182 and the end plate-side plate 183 are placed on the surface and the rear face of the core plate 181 in the state that their outer peripheries are protruded outward from the outer periphery of the core plate 181. The core plate 181 has a plate through hole 181h having a larger diameter than the diameter of the cooling water supply hole 166IN formed by the plate adhesive seal member 184 described later. The cell-side plate 182 and the end plate-side plate 183 respectively have plate through holes 182h and 183h respectively having diameters larger than the diameter of the cooling water supply hole 166IN but smaller than the diameter of the plate through hole 181h of the core plate 181.

The plate adhesive seal member 184 is made of a rubber having sealing property and elasticity, for example, ethylene-propylene-diene rubber (EPDM), nitrile rubber (NBR) or fluororubber (FKM). The plate adhesive seal member 184 is bonded with the outer periphery of the cell-side plate 182 and the outer periphery of the end plate-side plate 183 in the state that the core plate 181 is placed between the cell-side plate 182 and the end plate-side plate 183, so as to cover and seal the outer peripheries of the respective plates. More specifically, the plate adhesive seal member 184 is bonded with the opposed outer peripheries of the cell-side plate 182 and the end plate-side plate 183 protruded from the outer periphery of the core plate 181 to cover and seal the outer peripheries of the respective plates. In other words, this causes the core plate 181 to be kept in the state that the core plate 181 is placed between the cell-side plate 182 and the end pate-side plate 186. The plate adhesive seal member 184 also forms the cooling water supply hole 166IN and, in the periphery of this supply hole, is bonded with hole inner circumferential walls of the respective plate through holes 181h to 183h of the core plate 181, the cell-side plate 182 and the end plate-side plate 183 and with plate faces of the cell-side plate 182 and the end plate-side plate 183 in hole peripheral areas of the plate through holes 182h and 183h, so as to cover end faces thereof. The description that the periphery of the cooling water supply hole 166IN is covered with the plate adhesive seal member 184 is similarly applicable to covering the peripheries of the other supply and discharge holes, i.e., the fuel gas supply hole 162IN, the fuel gas discharge hole 162OT, the oxidizing gas supply hole 164IN, the oxidizing gas discharge hole 164OT and the cooling water discharge hole 166OT.

The inter-plate pin 185 is formed in a flanged pin shape and is driven in from the end plate-side plate 183-side to engage with the core plate 181 and the end plate-side plate 183 by its small-diameter pin section and mechanically suppress misalignment of these plates. The end plate 170F is stacked on the terminal plate 160F, such that the end plate 170F does not interfere with the inter-plate pin 185. The same applies to the end plate 170F.

The following describes the process of covering the terminal plate 160F with the plate adhesive seal member 184, associated with a manufacturing procedure of the terminal plate 160F. FIG. 5 is a flowchart showing the manufacturing procedure of the terminal plate. The procedure first makes the surface, the rear face and the outer peripheral end face of the core plate 181 and the hole inner circumferential wall defining the plate through hole 181h subjected to gold plating (step S10). Gold plating of the surface and the rear face causes the resulting terminal plate 160F produced by stacking the three plates, i.e., the core plate 181, the cell-side plate 182 and the end plate-side plate 183, to have the corrosion resistance and the good electrical conductivity over the enter plate faces. The surface and the rear face in at least the outer peripheral area of the core plate 181, the outer peripheral end face and the hole inner circumferential wall of the plate through hole may be subject to gold plating.

The procedure subsequently places the gold-plated core plate 181 on the end plate-side plate 183 (step S20). These plates are stacked, such that the plate through hole 181h of the core plate 181 is substantially coaxial with the plate through hole 183h of the end plate-side plate 183. The procedure then mounts the plate adhesive seal member 184 in this state (step S30). The plate adhesive seal member 184 includes a frame-like seal section formed to surround the outer peripheral end face of the core plate 181 and frame-like seal sections formed to cover the hole inner circumferential walls of the supply and discharge holes, for example, the fuel gas supply hole 162IN and the cooling water supply hole 166IN. These seal sections are fit in the outer periphery and the plate through hole of the core plate 181. The procedure subsequently places the cell-side plate 182 on the core plate 181, such that the plate through hole 182h of the cell-side plate 182 is substantially coaxial with the plate through hole 181h of the core plate 181 (step S40). The procedure sets the respective plates under pressure in this state, heats the plate adhesive seal member 184 in the hole peripheral areas of the respective supply and discharge holes, for example, the fuel gas supply hole 162IN and the cooling water supply hole 166IN, from the cell-side plate 182-side and the end plate-side plate 183-side for a predetermined time, and cools down and cures the layered structure (step S50). The procedure then uses the inter-plate pin 185 to engage the core plate 181 with the end plate-side plate 183.

In the state that the core plate 181 is placed between the two plates, i.e., the cell-side plate 182 and the end plate-side plate 183, the plate adhesive seal member 184 is provided to cover the outer peripheries of the respective plates and keep this plate-sandwiched state. Additionally, the plate adhesive seal member 184 is provided in the peripheries of the respective supply and discharge holes, for example, the cooling water supply hole 166IN to cover the hole inner circumferential walls of the respective plate through holes 181h to 183h of the respective plates, i.e., the core plate 181, the cell-side plate 182 and the end plate-side plate 183, and the plate faces of the cell-side plate 182 and the end plate-side plate 183 in the hole peripheral areas of the plate through holes 182h and 183h. In this covering state, the plate adhesive seal member 184 is thermally fused and is bonded with the cell-side plate 182 and the end plate-side plate 183 in the dotted area of FIG. 3, i.e., in the hole peripheral areas of the plate through holes 182h and 183h. The core plate 181 is, however, plated with gold. Gold plating decreases the activity on the end face of the plate outer periphery which is the interface between the core plate 181 and the plate adhesive seal member 184. The core plate 181 is accordingly not bonded with the plate adhesive seal member 184 but is in the non-bonded state with respect to the end face. Additionally, in the core plate 181, gold plating of a hole inner circumferential wall 181hs also decreases the activity in the gold-plated hole inner circumferential wall 181hs of the plate through hole 181h. The core plate 181 is accordingly not bonded with the plate adhesive seal member 184 but is in the non-bonded state with respect to the hole inner circumferential wall 181hs. FIGS. 3 and 4 do not explicitly show the state that the plate outer peripheral areas of the cell-side plate 182 and the end plate-side plate 183 are bonded with the plate adhesive seal member 184. Like the dotted area shown in FIG. 3, the outer peripheral area of the cell-side plate 182 and the opposed outer peripheral area of the end plate-side plate 183 and the outer peripheral end faces of the cell-side plate 182 and the end plate-side plate 183 are bonded with the plate adhesive seal member 184.

The terminal plate 160E does not have the supply and discharge holes, for example, the fuel gas supply hole 162IN. As shown in FIG. 4, in the state that the core plate 181 is placed between the two plates, i.e., the cell-side plate 182 and the end plate-side plate 183, the plate adhesive seal member 184 is provided to cover the outer peripheries of the respective plates and keep this plate-sandwiched state. The core plate 181 is plated with gold and is accordingly in the non-bonded state that the plate adhesive seal member 184 is not bonded with the core plate 181 with respect to the end face of the plate outer periphery which is the interface between the plate adhesive seal member 184 and the core plate 181.

As described above, in the terminal plate 160F and the terminal plate 160E included in the fuel cell 10 of the embodiment, the core plate 181 which is the electrically conductive aluminum plate with the current collector terminal 161, is placed between the cell-side plate 182 and the end plate-side plate 183 which are made of titanium with high corrosion resistance. The plate outer peripheries of both the cell-side plate 182 and the end plate-side plate 183 are extended more outward than the outer periphery of the core plate 181. The plate adhesive seal member 184 is arranged to cover the outer peripheries of the respective plates including the core plate 181 and keep the above plate-sandwiched state. The core plate 181 has the gold-plated outer peripheral end face and is thereby in the non-bonded state with the plate adhesive seal member 184. The cell-side plate 182 and the end plate-side plate 183 are extended more outward than the outer periphery of the core plate 181 and are bonded with the plate adhesive seal member 184 on their opposed outer peripheries and their outer peripheral end faces.

In the unit cells 100 assembled with the terminal plate 160F and the terminal plate 160E described above, it is assumed that the cell temperature is varied, accompanied with the power generation operation of the fuel cell 10 and/or a variation in ambient temperature. In the terminal plate 160F and the terminal plate 160E, the core plate 181 and the cell-side plate 182 and the end plate-side plate 183 placed on the upper and lower sides of the core plate 181 (hereinafter both the cell-side plate and the end plate-side plate are called outer plates) repeat expansion and contraction at different degrees according to different linear expansion coefficients. Especially, the core plate 181 having the large linear expansion coefficient has the large degree of expansion and contraction. The core plate 181 placed between the outer plates, however, has the gold-plated outer peripheral end face and is thereby in the non-bonded state with the plate adhesive seal member 184. This does not cause the plate adhesive seal member 184 to be pulled or pushed back, accompanied with contraction of the core plate 181. This configuration of the terminal plate 160F and the terminal plate 160E for fuel cell of this embodiment accordingly suppresses deterioration of the plate adhesive seal member 184 keeping the plate-sandwiched state and enhances the durability of the terminal plates and thereby the durability of the fuel cell 10 including such terminal plates.

The terminal plate 160F included in the fuel cell 10 of the embodiment has the supply through holes and the discharge through holes (hereinafter collectively referred to as "supply/discharge through holes"), for example, the fuel gas supply hole 162IN and the fuel gas discharge hole 162OT, which are respectively involved in supply and discharge of the fuel gas, the oxidizing gas the cooling water to and from the unit cells 100 and are placed on the inner side of the plate outer periphery. In the terminal plate 160F included in the fuel cell 10 of the embodiment, the core plate 181 has the plate through hole 181h having the diameter larger than the diameter of each supply/discharge through hole, for example, the fuel gas supply hole 1621N or the fuel gas discharge hole 162OT, in the periphery of the supply/discharge through hole. The outer plates have the plate through holes 182h and 183h having the diameters larger than the diameter of each supply/discharge through hole, for example, the fuel gas supply hole 1621N or the fuel gas discharge hole 162OT but smaller than the plate through hole 181h, in the periphery of the supply/discharge through hole. In the terminal plate 160F of the embodiment, the plate adhesive seal member 184 is placed between the outer plates to form each supply/discharge through hole, for example, the fuel gas supply hole 1621N or the fuel gas discharge hole 162OT and cover the hole inner circumferential walls of the plate through holes 181h to 183h of the respective metal plates. The core plate 181, however, has the gold-plated hole inner circumferential wall 181hs of the plate through hole 181h and is thereby in the non-bonded state with the plate adhesive seal member 184. The outer plates, i.e., the cell-side plate 182 and the end plate-side plate 183, are bonded with the plate adhesive seal member 184 on the opposed plate surfaces in the hole peripheral areas of the plate through holes 182h and 183h, the hole inner circumferential walls of the plate through holes 182h and 183h and the plate outer peripheral end face described above. As described above, this configuration of the terminal plate 160F prevents the plate adhesive seal member 184 from being pulled by the plate outer peripheral end face of the core plate 181 and additionally prevents the plate adhesive seal member 184 from being pulled accompanied with a large degree of contraction of the core plate 181 in the periphery of each supply/discharge through hole, for example, the fuel gas supply hole 1621N or the fuel gas discharge hole 162OT. As a result, the terminal plate 160F for fuel cell of the embodiment suppresses deterioration of the plate adhesive seal member 184 with high effectiveness and favorably improves the durability of the fuel cell 10.

In the terminal plate 160F and the terminal plate 160E included in the fuel cell 10 of the embodiment, the inter-plate pin 185 is used to mechanically suppress the misalignment between the core plate 181 and the end plate-side plate 183. In an application of the fuel cell 10 mounted on, for example, a vehicle, this configuration prevents the unintentional displacement of the core plate 181 and the end plate-side plate 183 even in the case that an impact due to a collision is applied to various parts of the fuel cell 10.

The fuel cell 10 of the embodiment is produced by stacking a plurality of the unit cells 100 or the fuel cell units as the power generation units and placing the terminal plate 160F and the terminal plate 160E on one end side and the other end side in the stacking direction. The fuel cell 10 of the embodiment includes the terminal plate 160F and the terminal plate 160E having the durability improved by suppressing deterioration of the plate adhesive seal members 184 and thereby has the improved durability and the long cell life. The fuel cell 10 of the embodiment is manufactured by simply replacing the terminal plates of the existing fuel cell with the terminal plates 160F and 160E. This reduces the manufacturing cost.

The invention is not limited to the embodiment described above but may be implemented by a diversity of other configurations without departing from the scope of the invention. For example, the technical features of the above embodiment corresponding to the technical features of the respective aspects described in Summary may be replaced or combined appropriately, in order to solve part or all of the problems described above or in order to achieve part or all of the advantageous effects described above. Any of the technical features may be omitted appropriately unless the technical feature is described as essential in the description hereof.

Figure 6:
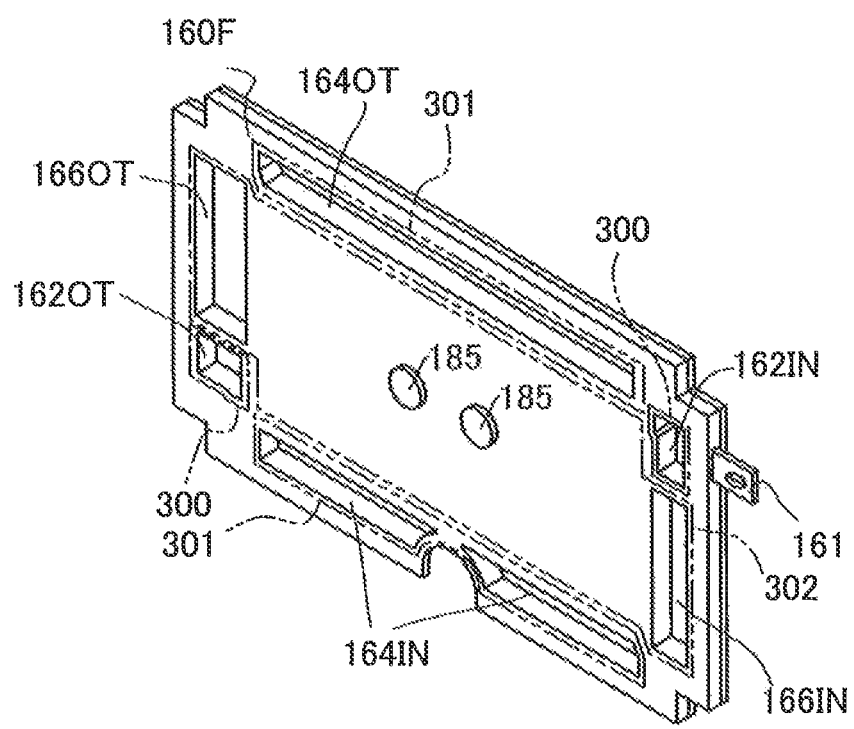
FIG. 6 is a schematic perspective view illustrating a terminal plate 160F according to another embodiment.

In the terminal plate 160F and the terminal plate 160E of the above embodiment, one inter-plate pin 185 is used to mechanically suppress the misalignment between the core plate 181 and the end plate-side plate 183. Alternatively the following configuration may be employed. FIG. 6 is a schematic perspective view illustrating a terminal plate 160F according to another embodiment. As illustrated, the terminal plate 160F of this embodiment uses two inter-plate pins 185 to engage the core plate 181 with the end plate-side plate 183 (shown in FIG. 3) and mechanically suppress the misalignment between the two plates. This configuration also suppresses another type of displacement, for example, rotational displacement between the two plates.

When it is necessary to form a cooling water flow path in the unit cell side according to the relationship of the terminal plate 160F of the above embodiment to the unit cells 100 to be stacked, a metal plate for formation of the cooling water flow path may be provided on the cell-side plate 182.

In the terminal plate 160F and the terminal plate 160E of the above embodiment, the core plate 181 is plated with gold, so that the core plate 181 is not bonded with the plate adhesive seal member 184 on the outer peripheral end face and the hole inner circumferential wall 181$hs$. Gold plating is, however, not essential but may be replaced with another plating process using, for example, chromium to decrease the activity or with an oxide coating process.

The present application claims priority from Japanese patent application (application number 2013-224967) under the title of invention of "terminal plate for fuel cell and fuel cell" filed on Oct. 30, 2012, the entirety of the disclosure of which is hereby incorporated by reference into this application.

What is claimed is:

1. A terminal plate for a fuel cell, comprising:
a first metal plate being electrically conductive and configured to have a terminal element;
a second metal plate and a third metal plate having higher corrosion resistance than the first metal plate and placed on a surface and a rear face of the first metal plate, the second metal plate and the third metal plate having outer peripheral areas extended more outward than an outer periphery of the first metal plate; and
an elastic seal member bonded with the outer peripheral areas of the second and the third metal plates to seal outer peripheries of the first, the second and the third metal plates,
wherein each of the metal plates has supply through holes for supplying a fuel gas, an oxidizing gas and cooling water and discharge through holes for discharging the fuel gas, the oxidizing gas and the cooling water, in its outer peripheral area,
the first metal plate has plate through holes having diameters larger than diameters of the supply through holes and the discharge through holes,
the second and the third metal plates respectively have plate through holes having diameters larger than the diameters of the supply through holes and the discharge through holes but smaller than the diameters of the plate through holes in the first metal plate, and
the elastic seal member is bonded with hole peripheral areas of the plate through holes in the opposed second and third metal plates to form the supply through holes and the discharge through holes.

2. The terminal plate according to claim 1,
wherein the elastic seal member is bonded with the outer peripheral areas of the opposed second and third metal plates respectively placed on the surface and the rear face of the first metal plate.

3. The terminal plate according to claim 2,
wherein the elastic seal member is further bonded with outer peripheral end faces of the second and the third metal plates.

4. The terminal plate according to claim 1,
wherein the elastic seal member is further bonded with hole inner circumferential walls of the plate through holes in the second and the third metal plates.

5. The terminal plate according to claim 1,
wherein an outer peripheral end face of the first metal plate is plated with gold.

6. A fuel cell, comprising:
a cell stack in which a plurality of fuel cell units as power generation units are stacked; and
the terminal plates according to claim 1 placed on one end and another end in a stacking direction of the cell stack.

7. The terminal plate according to claim 2,
wherein the surface and the rear face in at least the outer peripheral area of the first metal plate and an outer peripheral end face of the first metal plate are plated with gold.

8. The terminal plate according to claim 3,
wherein the surface and the rear face in at least the outer peripheral area of the first metal plate and an outer peripheral end face of the first metal plate are plated with gold.

9. The terminal plate according to claim 1,
wherein the surface and the rear face in at least the outer peripheral area of the first metal plate and an outer peripheral end face of the first metal plate are plated with gold.

10. The terminal plate according to claim 4,
wherein the surface and the rear face in at least the outer peripheral area of the first metal plate and an outer peripheral end face of the first metal plate are plated with gold.

* * * * *